(12) United States Patent
Haruki et al.

(10) Patent No.: US 11,891,181 B2
(45) Date of Patent: Feb. 6, 2024

(54) OUTER PANEL-MEDIATED COOLING SYSTEM

(71) Applicant: Kawasaki Jukogyo Kabushiki Kaisha, Kobe (JP)

(72) Inventors: Yu Haruki, Kobe (JP); Keiji Sakagawa, Kobe (JP); Kazuhide Hakamada, Kobe (JP); Ryosuke Mitani, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 418 days.

(21) Appl. No.: 17/418,242

(22) PCT Filed: Dec. 24, 2019

(86) PCT No.: PCT/JP2019/050593
§ 371 (c)(1),
(2) Date: Jun. 25, 2021

(87) PCT Pub. No.: WO2020/138075
PCT Pub. Date: Jul. 2, 2020

(65) Prior Publication Data
US 2022/0063816 A1 Mar. 3, 2022

(30) Foreign Application Priority Data
Dec. 27, 2018 (JP) ................ 2018-245268

(51) Int. Cl.
*B64D 13/00* (2006.01)
*B64D 13/02* (2006.01)

(52) U.S. Cl.
CPC ........... *B64D 13/006* (2013.01); *B64D 13/02* (2013.01)

(58) Field of Classification Search
CPC ................. B64D 13/006; B64D 13/02; B64D 2013/0688; B64D 2013/0625; B64D 2013/0614; B64D 2013/0662; B64D 13/08
See application file for complete search history.

(56) References Cited

U.S. PATENT DOCUMENTS

| 4,819,720 A | 4/1989 | Howard |
| 4,969,509 A | 11/1990 | Merensky |

(Continued)

FOREIGN PATENT DOCUMENTS

| JP | 1-311999 A | 12/1989 |
| JP | 2010-519119 A | 6/2010 |
| JP | 2012-126392 A | 7/2012 |

*Primary Examiner* — Len Tran
*Assistant Examiner* — Kamran Tavakoldavani
(74) *Attorney, Agent, or Firm* — XSENSUS LLP (57) ABSTRACT

An outer panel-mediated cooling system includes a heat source chamber; a cooling path that is located between outer and inner panels; a non-cooling path that is located between the outer and inner panels and thermally insulated from a cooling path and the outer panel and through which at least one of pressurized gas and return gas from the heat source chamber passes; a mixing chamber into which cooled gas leaving the cooling path and an uncooled gas leaving the non-cooling path flow, in which the cooled gas and the uncooled gas are mixed to form a mixed gas, and out of which the mixed gas flows toward the heat source chamber; and a flow rate regulating valve that regulates a flow rate of gas flowing toward the mixing chamber.

5 Claims, 6 Drawing Sheets

(56) References Cited

U.S. PATENT DOCUMENTS

| | | |
|---|---|---|
| 5,702,073 A | 12/1997 | Fluegel |
| 2011/0009042 A1 | 1/2011 | Joern |
| 2012/0156979 A1 | 6/2012 | Gray et al. |
| 2017/0036769 A1* | 2/2017 | Humfeldt ............... B64D 13/06 |

* cited by examiner

OUTER PANEL-MEDIATED COOLING SYSTEM

CROSS-REFERENCE TO RELATED APPLICATIONS

This application is based on PCT filing PCT/JP2019/050593, filed Dec. 24, 2019, which claims priority to and the benefit of Japanese Patent Application No. 2018-245268, filed on Dec. 27, 2018, the entire disclosure of each are incorporated herein by reference.

TECHNICAL FIELD

The present invention relates to an outer panel-mediated cooling system using a cooled gas resulting from heat exchange with an external fluid via an outer panel.

BACKGROUND ART

In recent years, transportation machines have been increasingly electrified, and electronic devices have become more and more sophisticated and miniaturized. This has led to a growing demand for thermal management in transportation machines such as watercrafts, railcars, automobiles, and aircrafts which are equipped with a large number of the sophisticated, miniaturized devices. Aircrafts, which are an example of the transportation machines, have traditionally incorporated a heat sink to cool the electronic devices. The heat sink makes use of high-altitude cool air taken in through an air scoop located on the aircraft body surface. The use of such a heat sink has posed problems such as increased air resistance due to discontinuity of the aircraft body surface and entry of foreign matter into the air scoop. To address these problems, outer panel-mediated heat exchangers have been proposed which are adapted to effect heat exchange between high-altitude cool air and interior-circulating air. Patent Literatures 1 and 2 each disclose an outer panel-mediated heat exchanger installed in an aircraft.

The aircraft-installed outer panel-mediated heat exchanger of Patent Literature 1 includes a cool air chamber having a wall constituted in part by an outer panel and a cooling room communicating with the cool air chamber via inlet and outlet ducts. Air flowing into the cool air chamber from the cooling room through the outlet duct exchanges heat with atmospheric air via the outer panel and is thus cooled. The cooled air flows into the cooling room through the inlet duct and cools foods and drinks stored in the cooling room. To maintain the interior of the cooling room at a constant temperature, the ratio between air supply into and air discharge from the cooling room is adjusted by air flow rate regulating valves located in the inlet and outlet ducts.

The aircraft-installed outer panel-mediated heat exchanger of Patent Literature 2 includes a closed loop made up of an envelope formed between outer and inner panels, a compartment enclosing aircraft electronic devices, and exhaust and collector ducts connecting the compartment and envelope. Air whose temperature has been increased by heat released from the aircraft electronic devices in the compartment flows into the envelope through the exhaust duct and becomes cool by exchanging heat with outside air via the outer panel during passage through the envelope. The cooled air returns to the compartment through the collector duct and cools the aircraft electronic devices.

CITATION LIST

Patent Literature

PTL 1: Japanese Laid-Open Patent Application Publication No. H01-311999
PTL 2: U.S. Pat. No. 4,819,720

SUMMARY OF INVENTION

Technical Problem

In the above outer panel-mediated heat exchanger of Patent Literature 1, when the flow rate of cool air introduced into the cooling room (heat source chamber) to keep constant the temperature inside the cooling room is changed, the flow rate of the gas circulating between the cooling room and the cool air chamber also changes. Likewise, in the outer panel-mediated heat exchanger of Patent Literature 2, a change in the flow rate of cool air introduced into the compartment (heat source chamber) entails a change in the flow rate of air circulating in the closed loop including the compartment and envelope. That is, the degree of air cooling in the compartment into which cool air is delivered cannot be independent of the flow rate of cool air flowing into the heat source chamber.

The present invention has been made in view of the above circumstances, and an object of the present invention is to provide a technique for use in a transportation machine-installed outer panel-mediated cooling system that uses a cooled gas resulting from heat exchange with an external fluid via an outer panel and in which a gas including the cooled gas flows into a heat source chamber, the technique being adapted to permit the flow rate and temperature of the gas flowing into the heat source chamber to be adjusted independently of each other.

Solution to Problem

An outer panel-mediated cooling system of a transportation machine according to an aspect of the present invention includes: an outer shell including an outer panel and an inner panel located inward of the outer panel; a heat source chamber that is located inward of the inner panel and in which a gas receives heat from a heat source; a cooling path that is located between the outer and inner panels, into which at least one of a pressurized gas and a return gas from the heat source chamber flows, in which the at least one gas releases heat outside through the outer panel to change into a cooled gas, and out of which the cooled gas flows; a non-cooling path that is located between the outer and inner panels and thermally insulated from the cooling path and the outer panel and through which at least one of the pressurized gas and the return gas from the heat source chamber passes; a mixing chamber into which the cooled gas leaving the cooling path and an uncooled gas leaving the non-cooling path flow, in which the cooled gas and the uncooled gas are mixed to form a mixed gas, and out of which the mixed gas flows toward the heat source chamber; and a flow rate regulating valve that regulates a flow rate of gas flowing toward the mixing chamber. The flow rate regulating valve includes at least one of a first flow rate regulating valve that regulates a flow rate of the cooled gas flowing from the cooling path toward the mixing chamber and a second flow rate regulating valve that regulates a flow rate of the uncooled gas flowing from the non-cooling path toward the mixing chamber.

Advantageous Effects of Invention

According to the present invention, in a transportation machine-installed outer panel-mediated cooling system that uses a cooled gas resulting from heat exchange with an external fluid via an outer panel and in which a gas including the cooled gas flows into a heat source chamber, the flow rate and temperature of the gas flowing into the heat source chamber can be adjusted independently of each other.

DESCRIPTION OF EMBODIMENTS

Hereinafter, an exemplary embodiment of the present invention will be described with reference to the drawings. An outer panel-mediated cooling system 1 according to the exemplary embodiment is applicable to transportation machines such as watercrafts (including submersibles), railcars, automobiles, and aircrafts, and used to cool a gas in a heat source chamber 41 located inside a transportation machine. The gas in the heat source chamber 41 receives heat from a heat source, and thus the temperature of the gas is increased. Examples of the heat source include, but are not limited to: an electronic device including heat-generating parts, such as a control board, an engine control unit (ECU), or a computer; a friction heat-generating mechanical part such as a bearing; a battery; and a passenger. The following describes an example where the outer panel-mediated cooling system 1 is applied to an aircraft 10 which is an example of the transportation machine.

Figure 1:
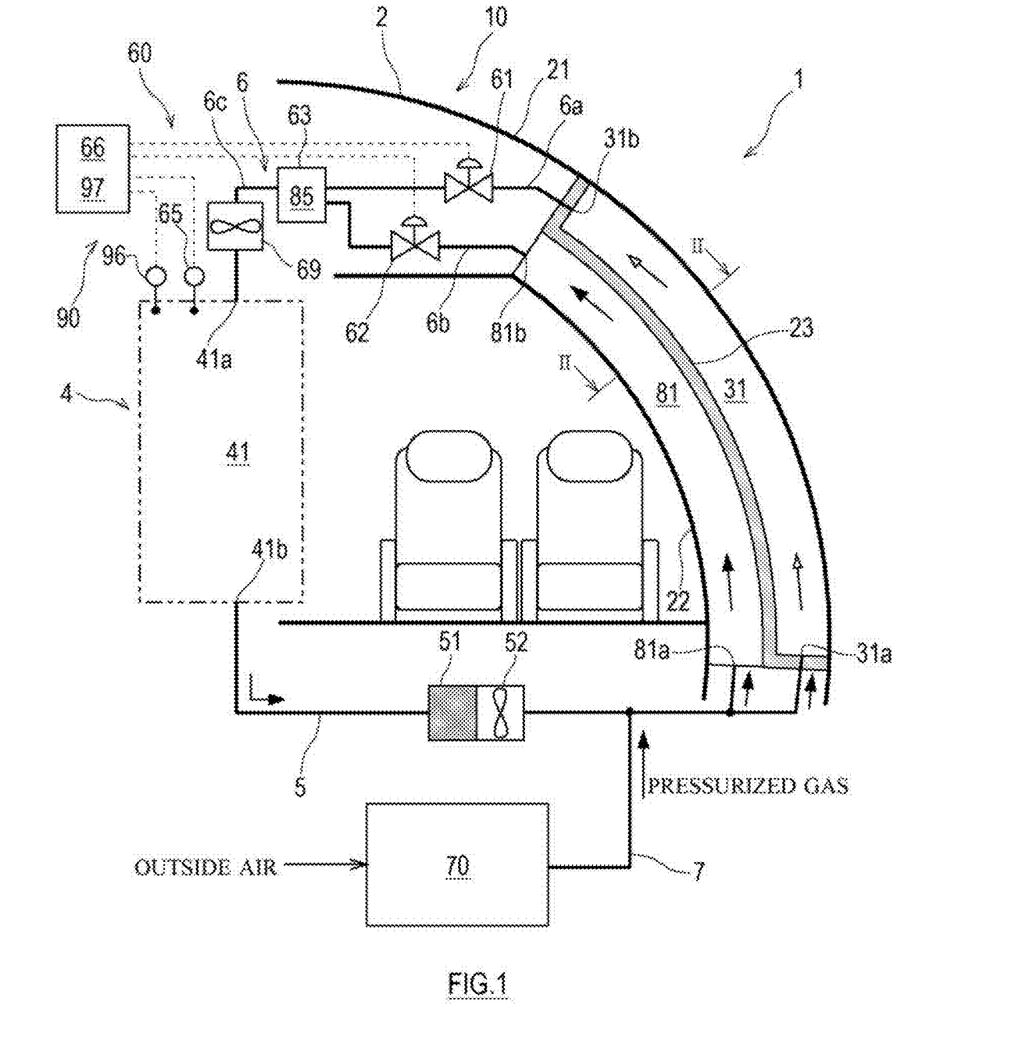
FIG. 1 illustrates a schematic configuration of an outer panel-mediated cooling system according to an exemplary embodiment of the present invention.
Figure 2:
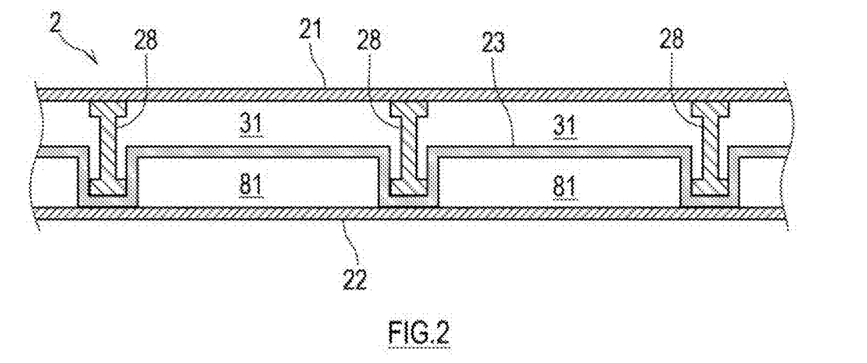
FIG. 2 is a cross-sectional view taken along the arrow II-II of FIG. 1.

FIG. 1 illustrates a schematic configuration of the outer panel-mediated cooling system 1 according to the exemplary embodiment of the present invention, and FIG. 2 is a cross-sectional view taken along the arrow II-II of FIG. 1. Shown in FIG. 1 is a cross-section of a part of the fuselage of the aircraft 10 which is an example of the transportation machine to which the outer panel-mediated cooling system 1 is applied.

The aircraft 10 of FIG. 1 includes an outer shell 2. The outer shell 2 includes an outer panel 21, an inner panel 22 spaced inward from the outer panel 21, and a heat-insulating layer 23 located between the outer and inner panels 21 and 22. The outer panel 21 is made of, for example, an aluminum alloy or a carbon fiber-reinforced plastic (CFRP). The inner panel 22 forms a wall separating the interior and exterior of the aircraft body. Inward of the inner panel 22 there are, for example, a cockpit, a cabin, a cargo compartment, an electronic equipment compartment accommodating aircraft electronic devices, and a mechanical equipment compartment accommodating machinery including the engine.

The heat-insulating layer 23 thermally insulates the outer and inner panels 21 and 22. The heat-insulating layer 23 may be in the form of, for example, a vacuum insulator. In an example, the vacuum insulator is made up of a porous, thermally insulating core formed in a desired shape and a laminated film covering the core, and the interior of the laminated film is depressurized to a substantially perfect vacuum.

In the aircraft 10 configured as described above, the outer panel-mediated cooling system 1 is constructed which uses a cooled gas resulting from heat exchange with an external fluid via the outer panel 21. The outer panel-mediated cooling system 1 includes a circulation loop 4 for gases. The circulation loop 4 includes: the interior of the outer shell 2 which includes a cooling path 31 and a non-cooling path 81; the heat source chamber 41; a cool gas line 6 that delivers a cool gas (mixed gas) from the interior of the outer shell 2 to the heat source chamber 41; and a hot gas line 5 that delivers a hot gas (return gas from the heat source chamber 41) from the heat source chamber 41 to the interior of the outer shell 2.

The cooling path 31 and non-cooling path 81 are located in the interior of the outer shell 2. The cooling path 31 is located between the outer and inner panels 21 and 22 and thermally insulated from the inner panel 22. In other words, the cooling path 31 is a space surrounded by the outer panel 21 and heat-insulating layer 23. The cooling path 31 extends in the upward/downward direction along the inner side of the outer panel 21, and has an inlet 31a and outlet 31b at its bottom and top, respectively. At least one of a pressurized gas and the return gas from the heat source chamber 41 flows into the cooling path 31 through the inlet 31a, and the at least one gas releases heat outside through the outer panel 21 to change into the cooled gas, which flows out of the cooling path 31 through the outlet 31b. The outer panel 21 is exposed to a high-altitude external fluid during flight of the aircraft 10. The external fluid and the gas in the cooling path 31 exchange heat via the outer panel 21, and thus the gas in the cooling path 31 is cooled.

The non-cooling path 81 is located between the outer and inner panels 21 and 22 and extends parallel to the cooling path 31. The non-cooling path 81 is thermally insulated from the cooling path 31 and outer panel 21 by the heat-insulating layer 23. At least one of the pressurized gas and the return gas from the heat source chamber 41 flows into the non-cooling path 81 through an inlet 81a, and the gas flows along the route defined by the non-cooling path 81 and flows out of the non-cooling path 81 through the outlet 81b.

As shown in FIG. 2, the heat-insulating layer 23 divides the space between the outer and inner panels 21 and 22 into aircraft interior-side regions and aircraft exterior-side regions and makes inward detours to avoid frames 28. In the space between the outer and inner panels 21 and 22, the aircraft exterior-side regions outward of the heat-insulating layer 23 serve as the cooling paths 31, and the aircraft interior-side regions inward of the heat-insulating layer 23 serve as the non-cooling paths 81. The frames 28 joined to the outer panel 21 are thermally insulated from the inner panel 22 by the heat-insulating layer 23 and located in the cooling paths 31. The non-cooling paths 81 are thermally insulated from the outer panel 21, the cooling paths 31, and the frames 28 joined to the outer panel 21. The arrangement and shape of the heat-insulating layer 23 are not limited to those described above and may be varied appropriately for the structure of the aircraft body as described below.

Figure 3:
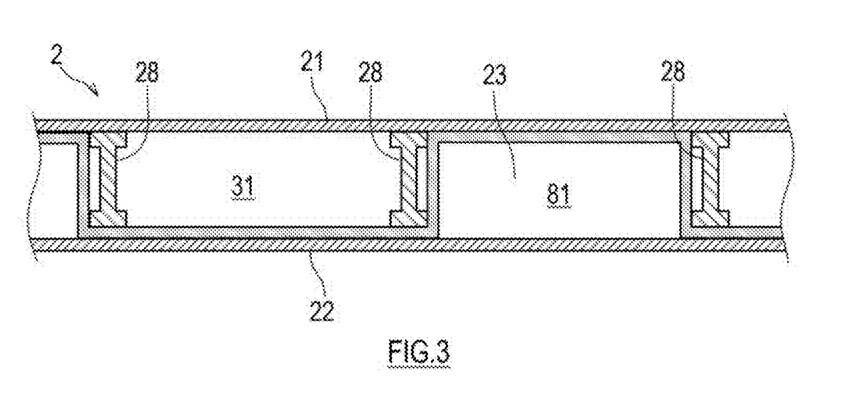
FIG. 3 illustrates a first variant of cooling and non-cooling paths located between outer and inner panels.

For example, as shown in FIG. 3, the heat-insulating layer 23 may be in a serpentine shape in which portions contacting the outer panel 21 and spaced from the inner panel 22 and portions contacting the inner panel 22 and spaced from the outer panel 21 alternate in the forward/rearward direction of the aircraft body. In this case, the cooling paths 31 and the non-cooling paths 81 are alternately arranged in the forward/rearward direction of the aircraft body.

Figure 4:
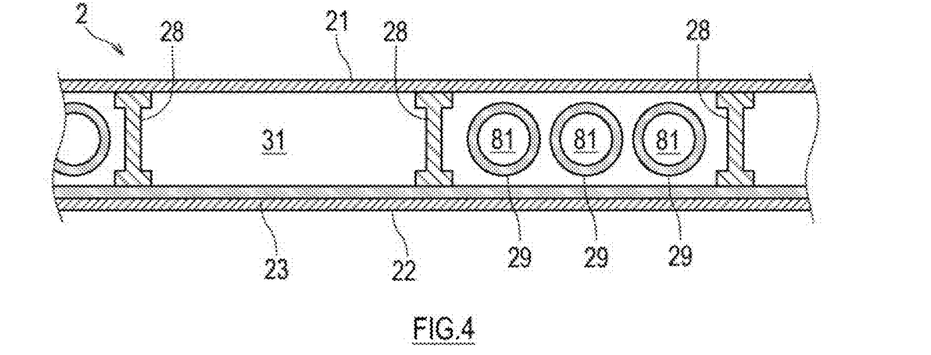
FIG. 4 illustrates a second variant of the cooling and non-cooling paths located between the outer and inner panels.

Alternatively, as shown in FIG. 4, the heat-insulating layer 23 may be in contact with the inner panel 22 and spaced from the outer panel 21. In this case, the regions defined between the heat-insulating layer 23 and outer panel 21 serve as the cooling paths 31, and the non-cooling paths 81 are formed inside thermally-insulated tubes 29 inserted in the cooling paths 31.

Figure 5:
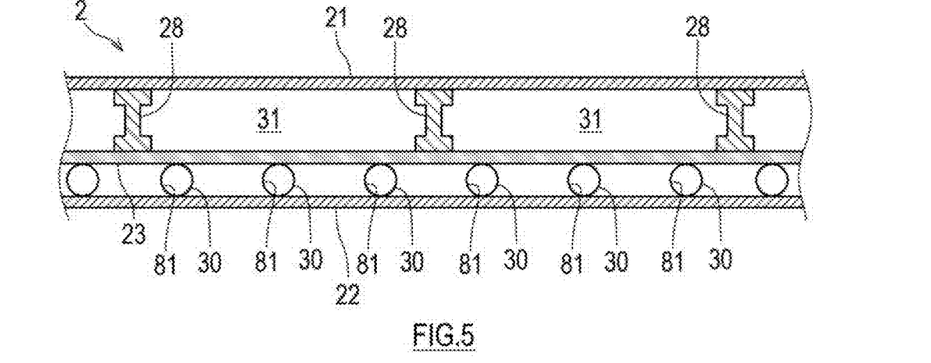
FIG. 5 illustrates a third variant of the cooling and non-cooling paths located between the outer and inner panels.

Alternatively, as shown in FIG. 5, the frames 28 may have a length smaller than the distance between the outer and inner panels 21 and 22, and the heat-insulating layer 23 may extend in contact with the aircraft interior-side ends of the frames 28 and be spaced from the outer and inner panels 21 and 22. In this case, in the space between the outer and inner panels 21 and 22, the aircraft exterior-side regions outward of the heat-insulating layer 23 serve as the cooling paths 31. The non-cooling paths 81 are formed inside ducts 30 placed in the aircraft interior-side regions inward of the heat-insulating layer 23.

Referring back to FIG. 1, the cool gas line 6 includes conduits connecting the outlets 31b and 81b of the cooling path 31 and non-cooling path 81 to an inlet 41a of the heat source chamber 41. To the outlet 31b of the cooling path 31 is connected an outlet conduit 6a, and the outlet conduit 6a is provided with a first flow rate regulating valve 61. To the outlet 81b of the non-cooling path 81 is connected an outlet conduit 6b, and the outlet conduit 6b is provided with a second flow rate regulating valve 62. Both of the two outlet conduits 6a and 6b are connected to a mixing tank 63. The mixing tank 63 defines a mixing chamber 85 in which the cooled gas leaving the cooling path 31 and the uncooled gas (hot gas) leaving the non-cooling path 81 are mixed.

The mixing tank 63 and the inlet 41a of the heat source chamber 41 are connected by a supply conduit 6c. The mixed gas composed of the cooled gas and uncooled gas flows out of the mixing chamber 85 into the heat source chamber 41. The supply conduit 6c is provided with a blower fan 69 that delivers the mixed gas toward the heat source chamber 41. At least one of the mixing tank 63, the supply conduit 6c, and the region in the vicinity of the inlet 41a of the heat source chamber 41 is provided with a temperature sensor 65 that detects the temperature of the mixed gas flowing into the heat source chamber 41.

The hot gas line 5 includes conduits connecting the outlet 41b of the heat source chamber 41 to the inlets 31a and 81a of the cooling path 31 and non-cooling path 81. The hot gas line 5 is provided with a filter 51 that removes foreign matter from the return gas from the heat source chamber 41 and an induced draft fan 52 that delivers the return gas toward the cooling path 31 and non-cooling path 81.

To the hot gas line 5 (or the inlet 31a of the cooling path 31) is connected a pressurized gas line 7. The pressurized gas line 7 supplies the pressurized gas to the hot gas line 5 (or the inlet 31a of the cooling path 31). The pressurized gas is produced by a pressurizer 70 which takes in outside air and compresses the taken air to a pressure higher than that of the gas in the heat source chamber 41. The pressurizer 70 may be, for example, at least one of a compressor of an auxiliary power unit mounted on the transportation machine, an engine mounted on the transportation machine, and a cabin compressor driven by power from the engine.

In the exemplary embodiment, both the hot gas line 5 and pressurized gas line 7 are connected to the inlets 31a and 81a of the cooling path 31 and non-cooling path 81, and the return gas from the heat source chamber 41 and the pressurized gas flow into the cooling path 31 and non-cooling path 81. However, the hot gas line 5 and pressurized gas line 7 may be configured such that at least one of the return gas from the heat source chamber 41 and the pressurized gas flows into the cooling path 31 and non-cooling path 81 or that one of the return gas and the pressurized gas flows into one of the cooling path 31 and non-cooling path 81 while the other of the return gas and the pressurized gas flows into the other of the cooling path 31 and non-cooling path 81.

In the circulation loop 4 configured as described above, the gas in the heat source chamber 41 is drawn by the fan 52 into the hot gas line 5, passes through the filter 51 by which foreign matter is removed from the gas, and then flows into the cooling path 31 and non-cooling path 81. During passage through the cooling path 31, the gas exchanges heat with outside air and is cooled. The cooled gas leaving the cooling path 31 and the uncooled gas leaving the non-cooling path 81 are mixed in the mixing chamber 85, and the resulting mixed gas flows into the heat source chamber 41.

The outer panel-mediated cooling system 1 includes, in the circulation loop 4 configured as described above, a temperature regulator 60 and humidity regulator 90 for regulating the state (temperature and/or humidity) of the mixed gas flowing into the heat source chamber 41. Although the outer panel-mediated cooling system 1 according to the exemplary embodiment includes both the temperature regulator 60 and humidity regulator 90, the humidity regulator 90 may be omitted. When the control by the temperature regulator 60 and the control by the humidity regulator 90 conflict with each other, the control by the temperature regulator 60 may be given priority.

The temperature regulator 60 regulates the temperature of the mixed gas flowing into the heat source chamber 41 by regulating the mixing ratio between the cooled gas leaving the cooling path 31 and the uncooled gas leaving the non-cooling path 81. The temperature regulator 60 includes the first flow rate regulating valve 61, the second flow rate regulating valve 62, the temperature sensor 65, and a temperature controller 66. The first and second flow rate regulating valves 61 and 62 may be those which are capable of continuously varying the opening degrees of flow paths.

The temperature controller 66 is electrically connected to the first flow rate regulating valve 61, second flow rate regulating valve 62, and temperature sensor 65. The temperature controller 66 adjusts the opening degrees of the first and second flow rate regulating valves 61 and 62 based on a value detected by the temperature sensor 65 to bring the gas temperature detected by the temperature sensor 65 to a given temperature (target temperature). The adjustment of the opening degrees of the first and second flow rate regulating valves 61 and 62 results in adjustment of the mixing ratio between the cooled gas leaving the cooling path 31 and the uncooled gas leaving the non-cooling path 81. Alternatively, the opening degrees of the first and second flow rate regulating valves 61 and 62 may be adjusted such that the flow rates of the gases passing through the first and second flow rate regulating valves 61 and 62 are tailored to the flow rate of the wind created by the blower fan 69. When the aircraft is parked, the first flow rate regulating valve 61 may be closed, and the hot gas leaving the heat source chamber 41 may pass mainly through the non-cooling path 81 to return to the heat source chamber 41.

The humidity regulator 90 regulates the humidity of the gas returning to the heat source chamber 41 by regulating the mixing ratio between the cooled gas leaving the cooling path 31 and the uncooled gas leaving the non-cooling path 81. The humidity regulator 90 includes the first flow rate regulating valve 61, the second flow rate regulating valve 62, a humidity sensor (first humidity sensor) 96, and a humidity controller (first humidity controller) 97. The humidity sensor 96 is located in at least one of the mixing tank 63, the supply conduit 6c, and the inlet 41a of the heat source chamber 41, and detects the humidity of the mixed gas flowing into the heat source chamber 41.

The humidity controller 97 is electrically connected to the first flow rate regulating valve 61, second flow rate regulating valve 62, temperature sensor 65, and humidity sensor 96. The humidity controller 97 adjusts the opening degrees of the first and second flow rate regulating valves 61 and 62 based on values detected by the temperature sensor 65 and humidity sensor 96 to bring the humidity detected by the humidity sensor 96 to a given humidity (target humidity) at the temperature detected by the temperature sensor 65. The adjustment of the opening degrees of the first and second flow rate regulating valves 61 and 62 results in adjustment of the mixing ratio between the cooled gas leaving the cooling path 31 and the uncooled gas leaving the non-cooling path 81.

As described above, the outer panel-mediated cooling system 1 of a transportation machine according to the exemplary embodiment includes: an outer shell 2 including an outer panel 21 and an inner panel 22 located inward of the outer panel 21; a heat source chamber 41 that is located inward of the inner panel 22 and in which a gas receives heat from a heat source; a cooling path 31 that is located between the outer and inner panels 21 and 22, into which at least one of a pressurized gas and a return gas from the heat source chamber 41 flows, in which the at least one gas releases heat outside through the outer panel 21 to change into a cooled gas, and out of which the cooled gas flows; a non-cooling path 81 that is located between the outer and inner panels 21 and 22 and thermally insulated from the cooling path 31 and the outer panel 21 and through which at least one of the pressurized gas and the return gas from the heat source chamber 41 passes; a mixing chamber 85 into which the cooled gas leaving the cooling path 31 and an uncooled gas leaving the non-cooling path 81 flow, in which the cooled gas and the uncooled gas are mixed to form a mixed gas, and out of which the mixed gas flows toward the heat source chamber 41; and a flow rate regulating valve that regulates the flow rate of gas flowing toward the mixing chamber 85. The flow rate regulating valve may be at least one of a first flow rate regulating valve 61 that regulates a flow rate of the cooled gas flowing from the cooling path 31 toward the mixing chamber 85 and a second flow rate regulating valve 62 that regulates the flow rate of the uncooled gas flowing from the non-cooling path 81 toward the mixing chamber 85.

In the outer panel-mediated cooling system 1, the mixing ratio between the cooled gas leaving the cooling path 31 and the uncooled gas leaving the non-cooling path 81 can be changed by changing the opening degree of either of the first and second flow rate regulating valves 61 and 62, and thus the mixed gas flowing into the heat source chamber 41 can be conditioned to a desired state (temperature and/or humidity). As such, the flow rate and the state of the mixed gas flowing into the heat source chamber 41 can be adjusted independently of each other. In other words, the flow rate of the mixed gas delivered to the heat source chamber 41 can be adjusted to a desired level, and at the same time the mixed gas can be conditioned to a desired state.

Further, since in the outer panel-mediated cooling system 1 the cooled gas having a very low temperature and the uncooled gas having a higher temperature than the cooled gas are mixed in the mixing chamber 85 before flowing into the heat source chamber 41, the fluctuation in temperature of the gas flowing into the heat source chamber 41 through the inlet 41a can be reduced, and a local temperature change of the region in the vicinity of the inlet 41a can be avoided. Thus, the temperature distribution in the heat source chamber 41 can be made uniform.

As illustrated in the exemplary embodiment, the outer panel-mediated cooling system 1 may include: a temperature sensor 65 that detects the temperature of the gas in at least one of the heat source chamber 41 and the mixing chamber 85; and a temperature controller 66 that adjusts the opening degree of at least one of the first and second flow rate regulating valves 61 and 62 to control the temperature detected by the temperature sensor 65 to a given temperature.

In this configuration, the mixing ratio between the cool gas leaving the cooling path 31 and the hot gas leaving the non-cooling path 81 can be changed by changing the opening degree of at least one of the first and second flow rate regulating valves 61 and 62, and thus the temperature of the gas flowing into the heat source chamber 41 can be adjusted to a desired temperature. As such, the flow rate and temperature of the mixed gas flowing into the heat source chamber 41 under the action of the wind created by the blower fan 69 can be adjusted independently of each other. That is, the flow rate of the mixed gas supplied to the heat source chamber 41 by the blower fan 69 can be adjusted to a desired level, and at the same time the temperature of the mixed gas can be adjusted to a desired temperature.

As illustrated in the exemplary embodiment, the outer panel-mediated cooling system 1 may include a first humidity sensor 96 that detects the humidity of the gas in at least one of the heat source chamber 41 and the mixing chamber 85 and a first humidity controller 97 that adjusts the opening degrees of the first and second flow rate regulating valves 61 and 62 to control the humidity detected by the first humidity sensor 96 to a given humidity.

In this configuration, the mixing ratio between the cooled gas leaving the cooling path 31 and the uncooled gas leaving the non-cooling path 81 can be changed by changing the opening degrees of the first and second flow rate regulating valves 61 and 62, and thus the humidity of the mixed gas flowing into the heat source chamber 41 can be adjusted to a desired humidity.

As illustrated in the exemplary embodiment, when the transportation machine incorporating the outer panel-mediated cooling system 1 is an aircraft 10 and the gas flowing into the cooling path 31 includes the pressurized gas, the outer panel-mediated cooling system 1 may further include a pressurized gas line 7 that is connected to an inlet 31a of the cooling path 31 and that delivers the pressurized gas to the cooling path 31, the pressurized gas being produced by compressing outside air to a pressure higher than that of the gas in the cooling path 31.

The humidity of outside air is lower at high altitudes than at low altitudes. When the pressurized gas is produced by taking in and compressing high-altitude outside air with low humidity and allowed to flow into the cooling path 31, the occurrence of dew formation (freezing) in the cooling path 31 can be reduced.

First Variant

Figure 6:
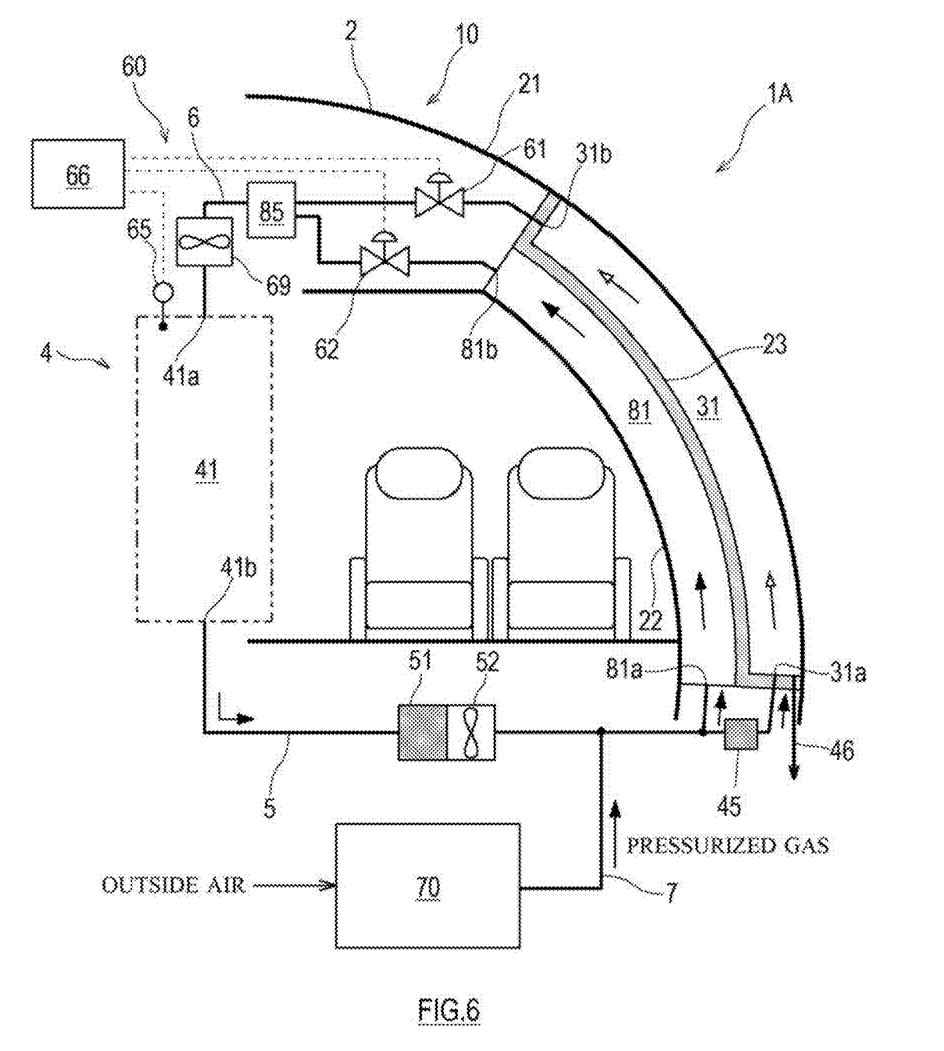
FIG. 6 illustrates a schematic configuration of an outer panel-mediated cooling system according to a first variant of the exemplary embodiment.

Hereinafter, a first variant of the above embodiment will be described. FIG. 6 illustrates a schematic configuration of an outer panel-mediated cooling system 1A according to the first variant of the above embodiment. For this variant, elements which are the same as or similar to those of the above embodiment are denoted by the same reference sings in the figure and will not be described below.

The outer panel-mediated cooling system 1A of FIG. 6 differs from the outer panel-mediated cooling system 1 according to the above embodiment in that the hot gas line 5 is provided with a dehumidifier 45 located immediately upstream of the inlet 31a of the cooling path 31 in the gas flow direction and that the outer panel-mediated cooling system 1A includes a drain 46 through which moisture accumulated in the cooling path 31 is discharged.

The dehumidifier 45 may be, but is not limited to, a desiccant dehumidifier. The desiccant dehumidifier is designed to perform dehumidification by adsorbing moisture onto a desiccant agent (zeolite), and typically includes zeolite, a heater for releasing moisture adsorbed onto the zeolite, and a heat exchanger for cooling the moisture into water drops.

As described above, the outer panel-mediated cooling system 1A according to this variant corresponds to the outer panel-mediated cooling system 1 of the above embodiment as modified to further include the dehumidifier 45 located in the hot gas line 5.

Since the hot gas line 5 is provided with the dehumidifier 45 as described above, the hot gas dehumidified by the dehumidifier 45 flows into the cooling path 31. Thus, the occurrence of dew formation in the cooling path 31 can be reduced.

Second Variant

Figure 7:
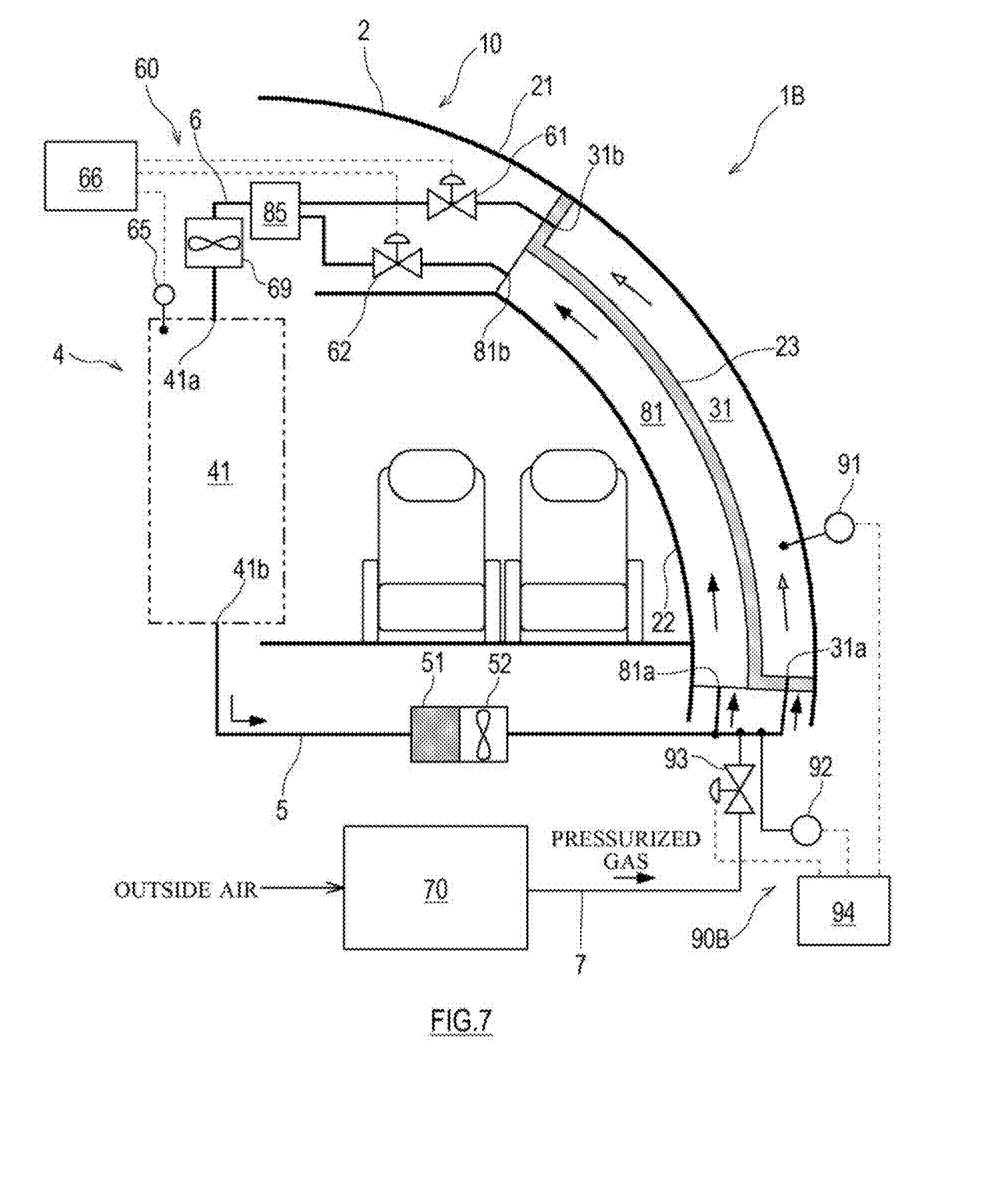
FIG. 7 illustrates a schematic configuration of an outer panel-mediated cooling system according to a second variant of the exemplary embodiment.

Next, a second variant of the above embodiment will be described. FIG. 7 illustrates a schematic configuration of an outer panel-mediated cooling system 1B according to the second variant of the above embodiment. For this variant, elements which are the same as or similar to those of the above embodiment are denoted by the same reference sings in the figure and will not be described below.

The outer panel-mediated cooling system 1B of FIG. 7 differs from the outer panel-mediated cooling system 1 according to the above embodiment by further including a humidity regulator 90B that regulates the humidity of the gas flowing into the cooling path 31.

The humidity regulator 90B includes: an intra-cooling path temperature sensor (second temperature sensor) 91 that detects the temperature of the gas in the cooling path 31; a temperature-humidity sensor 92 that detects the temperature and humidity of the gas flowing into the cooling path 31; a third flow rate regulating valve 93 that controls the flow rate of the pressurized gas delivered to the cooling path 31 through the pressurized gas line 7; and a humidity controller (second humidity controller) 94. The humidity regulator 90B may include a temperature sensor mounted on the inner surface of the outer panel 21 (such a temperature sensor is not shown) as the second temperature sensor that detects the temperature of the gas in the cooling path 31, and detect the temperature of the inner surface of the outer panel 21 in the cooling path 31 by this temperature sensor.

The humidity controller 94 is electrically connected to the intra-cooling path temperature sensor 91, temperature-humidity sensor 92, and third flow rate regulating valve 93. The humidity controller 94 determines the amount of saturated vapor in the gas in the cooling path 31 based on the temperature of the gas in the cooling path 31 as detected by the intra-cooling path temperature sensor 91. The humidity controller 94 determines a humidity (humidity threshold) of a gas having the temperature as detected by the temperature-humidity sensor 92 on the assumption that the gas contains moisture corresponding to the amount of saturated vapor at the intra-cooling path temperature. Since the humidity threshold is an estimate, the gas may be regarded as an ideal gas. The humidity controller 94 compares the humidity detected by the temperature-humidity sensor 92 to the humidity threshold. If the detected gas humidity is equal to or higher than the humidity threshold, the humidity controller 94 increases the opening degree of the third flow rate regulating valve 93 and allows a dry pressurized gas to be mixed with the gas flowing into the cooling path 31 to control the humidity detected by the temperature-humidity sensor 92 to below the humidity threshold (namely, to control the humidity detected to a humidity that does not cause dew formation in the cooling path 31). Alternatively, the humidity controller 94 may adjust the opening degree of the third flow rate regulating valve 93 to control the gas humidity to below the humidity threshold regardless of whether the detected value of the gas humidity is equal to or higher than the humidity threshold. When the second temperature sensor mentioned above is mounted on the inner surface of the outer panel 21, the humidity controller 94 may determine the humidity threshold based on the difference between the inner surface temperature of the outer panel 21 and the temperature detected by the temperature-humidity sensor 92 and on the humidity detected by the temperature-humidity sensor 92, and adjust the opening degree of the third flow rate regulating valve 93.

As described above, the outer panel-mediated cooling system 1B according to this variant corresponds to the outer panel-mediated cooling system 1 of the above embodiment as modified to further include the humidity regulator 90B that regulates the humidity of the gas flowing into the cooling path 31. The humidity regulator 90B includes the third flow rate regulating valve 93 that regulates the flow rate of pressurized gas 7 flowing from the pressurized gas line 7 toward the cooling path 31; the second temperature sensor (intra-cooling path temperature sensor 91) that detects the temperature of the gas in the cooling path 31; the second humidity sensor (temperature-humidity sensor 92) that detects the humidity of the gas flowing into the cooling path 31; and the second humidity controller 94. The second humidity controller 94 adjusts the opening degree of the third flow rate regulating valve 93 to control the humidity detected by the second humidity sensor (temperature-humidity sensor 92) to a given humidity that does not cause dew formation at the temperature detected by the second temperature sensor (intra-cooling path temperature sensor 91).

Thanks to the inclusion of the humidity regulator 90B, the moisture content of the gas flowing into the cooling path 31 is low enough not to cause dew formation in the cooling path 31. Thus, the occurrence of dew formation in the cooling path 31 can be reduced.

Third Variant

Figure 8:
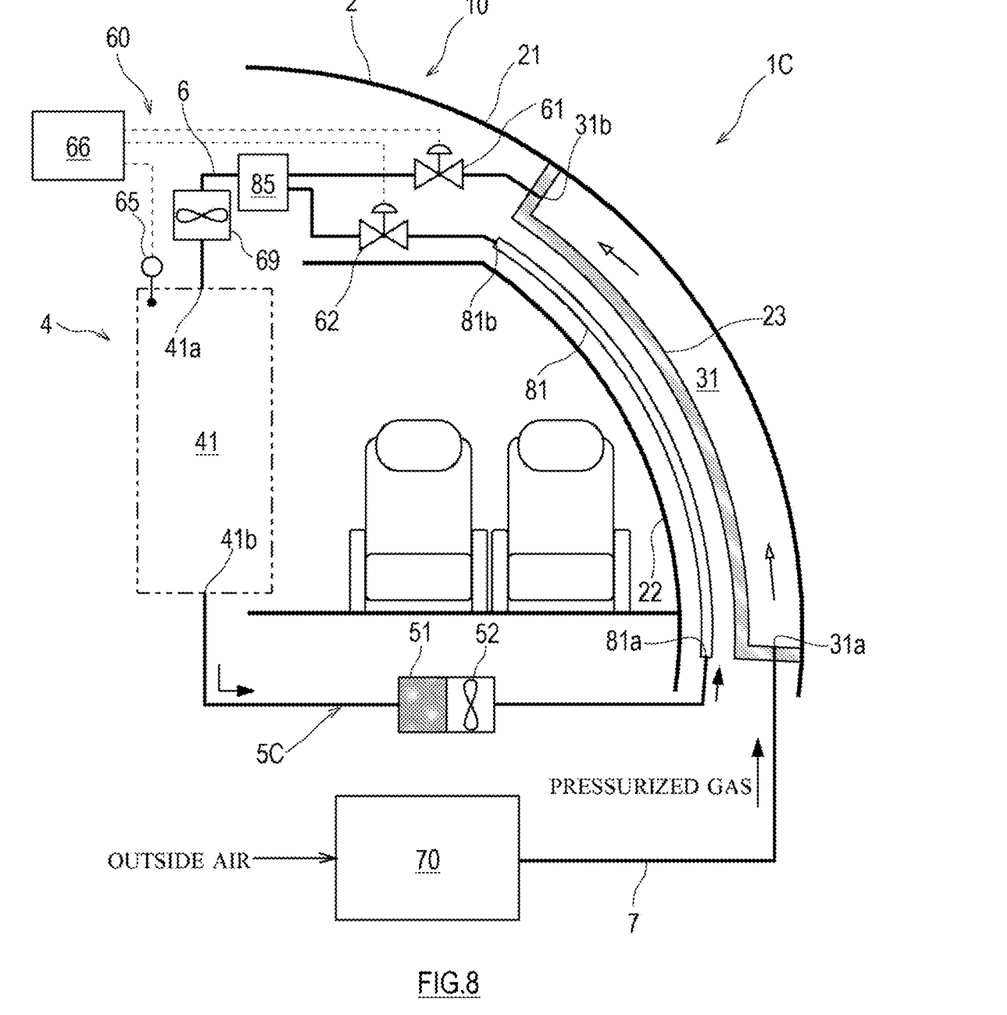
FIG. 8 illustrates a schematic configuration of an outer panel-mediated cooling system according to a third variant of the exemplary embodiment.

Next, a third variant of the above embodiment will be described. FIG. 8 illustrates a schematic configuration of an outer panel-mediated cooling system 1C according to the third variant of the above embodiment. For this variant, elements which are the same as or similar to those of the above embodiment are denoted by the same reference sings in the figure and will not be described below.

The outer panel-mediated cooling system 1C of FIG. 8 differs from the outer panel-mediated cooling system 1 according to the above embodiment in that the hot gas from the heat source chamber 41 does not flow into the cooling path 31, but only the pressurized gas flows into the cooling path 31 through the pressurized gas line 7.

In the outer panel-mediated cooling system 1C, the inlet 81a of the non-cooling path 81 is connected to the outlet 41b of the heat source chamber 41. To the inlet 31a of the cooling path 31 is connected the pressurized gas line 7. Thus, only the pressurized gas flows into the cooling path 31 through the pressurized gas line 7. During passage through the cooling path 31, the pressurized gas exchanges heat with outside air and is cooled to change into the cooled gas, and the cooled gas flows into the cool gas line 6 and is mixed with the uncooled gas coming from the non-cooling path 81.

As described above, the outer panel-mediated cooling system 1C according to this variant corresponds to the outer panel-mediated cooling system 1 of the above embodiment as modified to include a hot gas line 5C connecting the outlet 41b of the heat source chamber 41 to the inlet 81a of the non-cooling path 81 instead of the hot gas line 5 connecting the outlet 41b of the heat source chamber 41 to the inlets 31a and 81a of the cooling path 31 and non-cooling path 81 and allow only the pressurized gas, which has been pressurized to a pressure higher than that of the gas in the heat source chamber 41, to flow into the inlet 31a of the cooling path 31 through the pressurized gas line 7.

Thus, the gas flowing into the cooling path 31 consists solely of the pressurized gas having a lower moisture content than the return gas from the heat source chamber 41. As such, the occurrence of dew formation in the cooling path 31 can be reduced.

Although the foregoing has described a preferred embodiment (and its variants) of the present invention, the scope of the present invention embraces modifications made to the details of the structure and/or function of the above embodiment without departing from the concept of the present invention.

The invention claimed is:

1. An outer panel-mediated cooling system of a transportation machine, comprising:
    an outer shell including an outer panel and an inner panel located inward of the outer panel;
    a heat source chamber that is located inward of the inner panel and in which a gas receives heat from a heat source;
    a cooling path that is located between the outer and inner panels, into which at least one of a pressurized gas and a return gas from the heat source chamber flows, in which the at least one gas releases heat outside through the outer panel to change into a cooled gas, and out of which the cooled gas flows;
    a non-cooling path that is located between the outer and inner panels and thermally insulated from the cooling path and the outer panel and through which at least one of the pressurized gas and the return gas from the heat source chamber passes;
    a mixing chamber into which the cooled gas leaving the cooling path and an uncooled gas leaving the non-cooling path flow, in which the cooled gas and the uncooled gas are mixed to form a mixed gas, and out of which the mixed gas flows toward the heat source chamber; and
    a flow rate regulating valve that regulates a flow rate of gas flowing toward the mixing chamber, wherein
    the flow rate regulating valve includes at least one of a first flow rate regulating valve that regulates a flow rate of the cooled gas flowing from the cooling path toward the mixing chamber and a second flow rate regulating valve that regulates a flow rate of the uncooled gas flowing from the non-cooling path toward the mixing chamber.

2. The outer panel-mediated cooling system according to claim 1, further comprising:
    a temperature sensor that detects a temperature of the gas in at least one of the heat source chamber and the mixing chamber; and
    a temperature controller that adjusts an opening degree of at least one of the first and second flow rate regulating valves to control the temperature detected by the temperature sensor to a given temperature.

3. The outer panel-mediated cooling system according to claim 1, further comprising:
    a first humidity sensor that detects a humidity of the gas in at least one of the heat source chamber and the mixing chamber; and
    a first humidity controller that adjusts opening degrees of the first and second flow rate regulating valves to control the humidity detected by the first humidity sensor to a given humidity.

4. The outer panel-mediated cooling system according to claim 1, wherein
    the transportation machine is an aircraft,
    the gas flowing into the cooling path includes the pressurized gas, and
    the outer panel-mediated cooling system further comprises a pressurized gas line that is connected to an inlet of the cooling path and that delivers the pressurized gas to the cooling path, the pressurized gas being produced by compressing outside air to a pressure higher than that of the gas in the cooling path.

5. The outer panel-mediated cooling system according to claim 4, further comprising:
    a third flow rate regulating valve that regulates a flow rate of the pressurized gas flowing through the pressurized gas line toward the cooling path;
    a second temperature sensor that detects a temperature of the gas in the cooling path;
    a second humidity sensor that detects a humidity of the gas flowing into the cooling path; and
    a second humidity controller that adjusts an opening degree of the third flow rate regulating valve to control the humidity detected by the second humidity sensor to a given humidity that does not cause dew formation at the temperature detected by the second temperature sensor.

* * * * *